(12) United States Patent
Katagiri et al.

(10) Patent No.: US 7,780,154 B2
(45) Date of Patent: Aug. 24, 2010

(54) FLUID-FILLED TYPE ENGINE MOUNT

(75) Inventors: Akira Katagiri, Kasugai (JP); Tatsuya Suzuki, Kasugai (JP); Masaaki Hamada, Konan (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 1083 days.

(21) Appl. No.: 11/481,021

(22) Filed: Jul. 6, 2006

(65) Prior Publication Data

US 2007/0013115 A1    Jan. 18, 2007

(30) Foreign Application Priority Data

Jul. 14, 2005    (JP)    ............... 2005-206015
Jun. 19, 2006    (JP)    ............... 2006-169028

(51) Int. Cl.
    *F16F 5/00*    (2006.01)
(52) U.S. Cl. ................... 267/140.13; 267/219
(58) Field of Classification Search ............ 267/140.13, 267/140.11, 140.14, 35, 219; 248/562, 566, 248/636, 638
    See application file for complete search history.

(56) References Cited

U.S. PATENT DOCUMENTS

| | | | |
|---|---|---|---|
| 4,632,372 A * | 12/1986 | Nakajima et al. | 267/140.11 |
| 4,802,658 A | 2/1989 | Ushijima et al. | |
| 5,240,233 A * | 8/1993 | Kato et al. | 267/140.13 |
| 5,499,799 A | 3/1996 | Kojima | |
| 5,620,168 A * | 4/1997 | Ohtake et al. | 267/140.13 |
| 7,044,455 B2 * | 5/2006 | Yoshida et al. | 267/140.13 |

FOREIGN PATENT DOCUMENTS

| | | |
|---|---|---|
| JP | A 2-240430 | 9/1990 |
| JP | B2 7-54131 | 6/1995 |
| JP | A 8-4823 | 1/1996 |
| JP | A 10-132017 | 5/1998 |
| JP | A 11-30268 | 2/1999 |
| JP | A 2001-336564 | 12/2001 |
| JP | 2004301246 A * | 10/2004 |

* cited by examiner

*Primary Examiner*—Pam Rodriguez
(74) *Attorney, Agent, or Firm*—Oliff & Berridge, PLC

(57) ABSTRACT

A fluid-filled type engine mount having a pressure receiving chamber and an equilibrium chamber connected together through a first orifice passage, and an intermediate chamber connected to the equilibrium chamber through a second orifice passage. The intermediate chamber is partially defined by a movable film, and the pressure-receiving chamber and the intermediate chamber are situated to either side of the movable film. The movable film is a tabular rubber elastic body, and is imparted with non-linear spring properties in response to elastic deformation in a width direction thereof so that its deformation during input of idling vibration occurs in a low spring properties zone, whereas its deformation during input of vibration of greater amplitude than the idling vibration in a higher frequency range than a resonance frequency of the first orifice passage reaches a high spring properties zone.

11 Claims, 6 Drawing Sheets

FLUID-FILLED TYPE ENGINE MOUNT

INCORPORATED BY REFERENCE

The disclosure of Japanese Patent Application No. 2005-206015 filed on Jul. 14, 2005 and No. 2006-169028 filed on Jun. 19, 2006, each including the specification, drawings and abstract is incorporated herein by reference in its entirety.

BACKGROUND OF THE INVENTION

1. Field of the Invention

The present invention relates to a fluid-filled type engine mount designed to exhibit vibration damping action based on the flow action of a non-compressible fluid sealed therein, and more particularly to a fluid-filled type engine mount of novel construction furnished with a first orifice passage and a second orifice passage tuned to a higher frequency band than the first orifice passage, and able to produce vibration damping action against vibration in a multiplicity of wide frequency ranges.

2. Description of the Related Art

Engine mounts are known as components to be installed between a vehicle body and a power unit that includes an engine or other internal combustion engine, in order to provide vibration-damping coupling or vibration-damping support of the power unit on the body. One type of the engine mounts is a fluid-filled type engine mount that produces vibration damping action by utilizing the flow action, e.g. the resonance action, of a fluid produced when vibration is input across the mount. A mount of this kind comprises: a first mounting member and a second mounting member which are connected respectively to either the power unit or the body; a main rubber elastic body elastically connecting the first and second mounting members; a pressure-receiving chamber a portion of whose wall is constituted by the main rubber elastic body; an equilibrium chamber a portion of whose wall is constituted by a flexible film; and a non-compressible fluid sealed within this pressure-receiving chamber and the equilibrium chamber; and an orifice passage through which the two chambers communicate with each other.

Such a fluid-filled type engine mount is preferably able to produce excellent vibration damping action against vibration in a multiplicity of wide frequency ranges, in consideration of the existence of disturbances that could disrupt the prescribed operation condition and equilibrium condition. Particularly in the case of engine mounts for use in automobiles, since the frequency of input vibration to be damped can vary with driving conditions of the vehicle or other factors, the mount is required to function effectively to afford vibration damping ability of vibration in a multiplicity of wide frequency ranges. Specifically, it is a requirement that vibration damping action be produced, for example, against low frequency shaking vibration on the order of 10 Hz input during driving, as well as high frequency idling vibration on the order of 15-30 Hz input when the vehicle is at a stop.

In view of the problem discussed above, there have been proposed engine mounts that have a first orifice passage and a second orifice passage tuned to a higher frequency band than the first orifice passage. JP-A-10-132017, JP-A-8-4823, JP-B-7-54131, and JP-A 2001-336564 show examples of this type of engine mount.

In these engine mounts, there is disposed between the pressure-receiving chamber and the equilibrium chamber an intermediate chamber a portion of whose wall is constituted by a rubber elastic plate. The pressure-receiving chamber, the intermediate chamber, and the equilibrium chamber communicate with one another via a first orifice passage and a second orifice passage. With this design, the flow of the fluid induced to flow through the second orifice passage can be restricted by means of the rubber elastic plate during input of vibration in the resonance frequency range of the first orifice passage. This makes it possible to ensure flow of the fluid flowing through the first orifice passage. Also, by means of utilizing the resonance phenomenon of the rubber elastic plate during input of vibration in the resonance frequency range of the second orifice passage, fluid flow action of the second orifice passage can be actively actuated. This makes it possible to advantageously attain vibration damping effect based on flow action, e.g., resonance action of the fluid flowing through each orifice passage.

These engine mounts however have been suffer from a problem that when large vibrations are input across the first mounting member and the second mounting members, in some instances abnormal noise or vibration may be emitted by the mount. An investigation conducted by the inventors has shown that, in an automobile equipped with a fluid-filled type engine mount of conventional construction, abnormal noise or shock on a level that can be felt by passengers is sometimes produced in the cabin when the vehicle drives over deep corrugated pavement.

SUMMARY OF THE INVENTION

It is therefore one object of this invention to provide a fluid-filled type engine mount of novel construction able to advantageously produce vibration damping effect based on flow action of the non-compressible fluid sealed therein, and able to effectively suppress the occurrence of impulsive abnormal noise and vibration.

As a results of extensive experiments conducted by the inventors with respect to the conventional problems such as occurrence of abnormal noise and vibration, it has been revealed that when an automobile drives over deep corrugated pavement, for example, an impulsive vibrational load is applied between the first mounting member and the second mounting member, whose acceleration is greater than that of engine shakes, which has a large amplitude among input vibrations generally applied to the mount during driving of the automobile. Additionally, a specimen of the fluid-filled type engine mount having a visible fluid chamber was prepared, and a fluid action in the fluid-filled engine mount upon input of impulsive vibrational load generated during driving over the deep corrugated pavement has been observed. Through this observation, it has been revealed that air bubbles are generated in the intermediate chamber due to cavitation.

Conjecturing on the basis of theory relating to cavitation, the air bubbles that repeatedly form, burst, and disappear in the intermediate chamber, maintain stable generally spherical shape in the process of initial formation to growth, but undergo deformation during bursting. This forms explosive micro jets that in turn produce water hammer pressure which is propagated to the first mounting member and the second mounting member, ultimately reaching the automobile body. Accordingly, these micro jets would be a mechanism for the occurrence of abnormal noise and vibration which poses a problem in conventional fluid-filled type engine mounts of this kind.

Additionally, the inventors also have found the new fact that cavitation bubbles, which constitute the basic cause of problematic abnormal noise and vibration, are produced in the intermediate chamber upon input of vibration of amplitude greater than idling vibration, which represents vibration of amplitude in the resonance frequency range of the second orifice passage in a frequency range higher than the resonance frequency of the first orifice passage.

Focusing upon the theory that cavitation bubbles are produced due to a condition of high vacuum occurring in the intermediate chamber when amplitude vibration of prescribed magnitude and frequency range as discussed above is input, the inventors discovered that cavitation bubbles can be inhibited by means of inhibiting negative pressure within the intermediate chamber, and that impulsive abnormal noise and vibration can be inhibited thereby. The present invention has been developed upon the basis of this discovery.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the invention provides a fluid-filled type engine mount for a vibration damping coupling of two components, comprising: a first mounting member fixable to one of the two components; a second mounting member fixable to an other of the two components; a main rubber elastic body elastically connecting the first and second mounting members which are arranged in a spaced-away fashion; a pressure-receiving chamber whose wall is partially defined by the main rubber elastic body; an equilibrium chamber whose wall is partially defined by a flexible film; an intermediate chamber whose wall is partially defined by a movable film, the pressure-receiving chamber and the intermediate chamber being situated to either side of the movable film, and a non-compressible fluid being sealed within the pressure-receiving chamber, the equilibrium chamber, and the intermediate chamber; a first orifice passage interconnecting the pressure-receiving chamber and the equilibrium chamber, and formed such that a resonance frequency of the fluid caused to flow through the first orifice passage is tuned to that of engine shake; and a second orifice passage interconnecting the intermediate chamber and the equilibrium chamber, and formed such that a resonance frequency of the fluid caused to flow through the second orifice passage is tuned to that of idling vibration, wherein the movable film includes a tabular body composed of a rubber elastic body, and is imparted with non-linear spring properties in response to elastic deformation in a width direction thereof so that deformation of the movable film during input of the idling vibration occurs in a low spring properties zone, whereas deformation of the movable film during input of vibration of greater amplitude than the idling vibration in a higher frequency range than the resonance frequency of the first orifice passage reaches a high spring properties zone.

The fluid-filled type engine mount constructed according to this mode is able to utilize the non-linearity of the spring properties (pressure-deflection properties) of the movable film. This arrangement makes it possible to appropriately assure ample flow of fluids induced to flow through the first and second orifice passages, as well as to reduce or avoid the creation of a high level of negative pressure in the intermediate chamber.

Specifically, when engine shake, i.e. vibration of amplitude in the resonance frequency range of the first orifice passage is input, the amplitude of the pressure fluctuations produced in the pressure-receiving chamber is too large to be fully absorbed through elastic deformation (in particular, elastic deformation in the soft deformation zone) of the movable film, so that the flow of fluid through the second orifice passage is limited. The pressure fluctuations produced in the pressure-receiving chamber give rise to flow action, such as resonance action, of the fluid caused to flow through the first orifice passage between the pressure-receiving chamber and the equilibrium chamber. Consequently, vibration-damping effect (vibration attenuating effect) is advantageously attained on the basis of flow action of the fluid through the first orifice passage.

During input of idling vibration, i.e. vibration of amplitude in the resonance frequency range of the second orifice passage, the flow resistance of the first orifice passage rises markedly to the point that it becomes substantially closed off. However, as the pressure fluctuations produced in the pressure-receiving chamber are relatively small, pressure fluctuations of the pressure-receiving chamber are exerted efficiently on the intermediate chamber through elastic deformation of the movable film on the basis of the relatively soft spring properties of the non-linear spring zone in the movable film. Accordingly, the flow action of the fluid through the second orifice passage between the intermediate chamber and the equilibrium chamber is produced effectively. Consequently, vibration-damping action (vibration attenuating action) is advantageously attained on the basis of the flow action of the fluid flowing through the second orifice passage.

In the event of a situation, such as when the automobile drives over a deep corrugated pavement, in which vibration of amplitude greater than idling vibration is input in a frequency range higher than the resonance frequency of the first orifice passage, the movable film will undergo active and appreciable elastic deformation owing to large pressure fluctuations exerted on the pressure receiving chamber. Consequently, due to pressure fluctuations exerted on the intermediate chamber by means of elastic deformation of the movable film, a high level of negative pressure may possibly be created locally in the intermediate chamber.

Under conditions where vibration of amplitude greater than idling vibration is input in a frequency range higher than the resonance frequency of the first orifice passage, deformation of the movable film will extend into the high spring properties zone, limiting the elastic deformation of the movable film. Thus, the occurrence of a high vacuum condition within the intermediate chamber can be suppressed, and the occurrence of cavitation bubbles can be reduced or avoided.

In the event that vibration of amplitude greater than idling vibration is input in a frequency range lower than the resonance frequency of the first orifice passage, the pressure fluctuations produced in the pressure-receiving chamber will escape into the equilibrium chamber through the first orifice passage, avoiding the creation of excessive negative pressure within the intermediate chamber.

Since the fluid-filled type engine mount according to this mode is furnished with the movable film having non-linear spring properties, an adequate level of vibration damping action on the basis of flow action of fluids through the first and second orifice passages can be assured. Also, the hard spring properties of the non-linear spring zone of the movable film makes it possible to reduce or avoid excessive high negative pressure in the intermediate chamber, thought to be responsible for the formation of cavitation bubbles in the intermediate chamber. As a result, the problem of impulsive abnormal noise and vibration can be suppressed effectively.

The non-linear spring properties of the movable film take the general form of two linear zones of differing slope in the graph of the pressure-deflection curve. Specifically, it is provided with low spring properties in the low deflection zone, and with high spring properties in the high deflection zone. The design of the movable film is such that deformation of the movable film is produced in the low deflection zone when idling vibration is input, but reaches the high deflection zone when vibration of amplitude higher than idling vibration is input.

A second mode of the invention provides a fluid-filled type engine mount according to the first mode, wherein under conditions of input of vibration having amplitude at least 1.5 times that of the idling vibration in a frequency band higher than the resonance frequency of the first orifice passage, deformation of the movable film reaches the high spring properties zone.

In this mode, under conditions of input of vibration having amplitude at least 1.5 times that of idling vibration, which are thought to cause cavitation bubbles in particular, deformation of the movable film is limited on the basis of the high spring properties thereof. Accordingly, impulsive abnormal noise and vibration caused by cavitation bubbles are suppressed more effectively.

A third mode of the invention provides a fluid-filled type engine mount according to the first or second mode, wherein the movable film is furnished with a constrained portion for limiting the level of elastic deformation thereof so that non-linear spring properties is imparted to the movable film.

In this mode, during input of idling vibration, deformation of the movable film is produced in the low spring properties zone due to deformation of those portions of the movable film not furnished with the constrained portion (unconstrained portions); whereas during input of vibration of amplitude greater than idling vibration in a frequency band higher than the resonance frequency band of the first orifice passage, deformation of the movable film reaches to the high spring properties zone, on the basis of deformation of the constrained portion of the movable film.

A fourth mode of the invention provides a fluid-filled type engine mount according to any one of the first through third modes, wherein the movable film has a irregular-shape portion for imparting non-linear spring properties with respect to elastic deformation in a thickness direction of the movable film.

In this mode, non-linear spring properties are imparted to the movable film per se, on the basis of the shape, size, structure or other aspects of the irregular-shape portion formed in the movable film. With this arrangement, the film is easily and reliably imparted with the desired non-linear spring properties, while vibration damping action and noise reducing action are attained more advantageously. While the specific form of the irregular-shape portions is not limited in any particular way, in preferred practice, at least one of those recited in the fifth, sixth, or seventh modes of the invention will be employed.

A fifth mode of the invention provides a fluid-filled type engine mount according to the fourth mode, wherein the irregular-shape portion of the movable film is formed by a thick portion and a thin portion of mutually different thickness dimension so that the movable film is endowed with the non-linear spring properties.

A sixth mode of the invention provides a fluid-filled type engine mount according to the fourth mode, wherein the irregular-shape portion of the movable film is formed by a low spring portion of disk shape formed in a center of the movable film and a high spring portion of tapered shape formed to an outside periphery of the low spring portion with the high spring portion being situated projecting towards the pressure-receiving chamber so that the movable film is endowed with the non-linear spring properties.

In the fifth and sixth modes of the invention, during input of idling vibration, deformation of the movable film is produced in the low spring properties zone, on the basis of elastic deformation of the thin portion and elastic deformation of the portion of disk shape. When vibration of amplitude greater than idling vibration is input in a frequency band higher than the resonance frequency band of the first orifice passage, deformation of the movable film reaches the high spring properties zone, on the basis of elastic deformation of the thick portion and deformation of the tapered portion.

In the fifth mode, preferably, the thin portion is formed in the center portion of the movable film and the thick portion is formed in the outside peripheral portion of the movable film. Still more preferably, the thin portion formed in the center portion of the movable film has disk shape while the thick portion formed in the outside peripheral portion of the movable film has annular shape, or the tapered shape taught in the sixth mode. If the thick portion is formed in the center portion of the movable film, it becomes difficult to hold deformation of the thick portion to a low level by means of the thin portion present to the outside peripheral side thereof. On the other hand, if the thick portion is formed in the outside peripheral portion of the movable film, deformation of the thick portion can be advantageously limited by means of a rigid member or the like supporting the outside peripheral portion of the movable film. If the thin portion is formed in the center portion of the movable film, low spring properties thereof can be attained more efficiently by means of the thick portion present to the outside peripheral thereof.

A seventh mode of the invention provides a fluid-filled type engine mount according to any one of the fourth through sixth modes, wherein the movable film includes an elastic projecting portion integrally formed in a center portion thereof, extending in a direction of displacement of the movable film, being held in abutment at a distal end thereof against an inside face of the intermediate chamber positioned spaced apart from the movable film by a prescribed distance, and having a bending portion bending in a crank configuration disposed in a medial portion thereof so that the low spring properties is attained in a shearing deformation zone of the bending portion so as to endow the movable film with non-linear spring properties.

In this mode, the bending portion disposed between the movable film and the intermediate chamber inside wall face undergoes bending deformation by means of elastic deformation of the movable film on the basis of relative pressure differential between the pressure-receiving chamber and the intermediate chamber disposed to either side of the movable film. This bending deformation exhibits both a small stroke zone in which shearing deformation dominates, and a large stroke zone in which compressive deformation dominates. Consequently, non-linear spring properties can be attained thereby.

Accordingly, in the engine mount according to any one of the fifth, sixth, or seventh mode of the invention, by forming the irregular-shape portion of mutually different shape in each movable film, non-linear spring properties can function advantageously on the basis of the form of the non-linear spring properties of the irregular-shape portions.

A eighth mode of the invention provides a fluid-filled type engine mount according to any one of the first through seventh modes, further comprising: a partition member fixedly supported by means of the second mounting member and disposed between the pressure-receiving chamber and the equilibrium chamber, wherein the partition member has a recess opening towards the pressure-receiving chamber side and formed in a center portion of the partition member so that an opening of the recess is provided with fluid-tight closure by the movable film to form the intermediate chamber, and an outside peripheral portion of the partition member is utilized to form the first orifice passage and the second orifice passage.

In this mode, the intermediate chamber, the movable film, the first and second orifice passages and so on may be produced with a minimum of parts and with highly efficient use of space, providing an advantage in terms of making the mount more compact.

A ninth mode of the invention provides a fluid-filled type engine mount according to the eighth mode, wherein the second mounting member is of round tubular shape, the first mounting member is disposed spaced apart to a side of a first opening of the second mounting member, the first mounting member and the second mounting member are connected by the main rubber elastic body thereby providing fluid-tight closure of the first opening of the second mounting member, an other opening of the second mounting member being provided with a fluid-tight closure by the flexible film, and the partition member is inserted into the second mounting member and positioned between the opposed faces of the main rubber elastic body and the flexible film.

In this mode, the structure for affixing the partition member to the second mounting member is simplified, and the pressure-receiving chamber and equilibrium chamber are produced with a minimum of parts and with highly efficient use of space, providing an advantage in terms of making the mount more compact.

As will be apparent from the preceding description, in the fluid-filled type engine mount constructed in accordance with the present invention, the presence of the movable film endowed with non-linear spring properties makes it possible assure an adequate level of vibration damping action on the basis of flow action of fluids through the first and second orifice passages. At the same time, the hard spring properties of the non-linear spring zone of the movable film makes it possible to reduce or avoid conditions of high negative pressure thought to be responsible for the formation of cavitation bubbles. As a result, formation and bursting of bubbles can be suppressed, and the problem of impulsive abnormal noise and vibration can be suppressed effectively.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
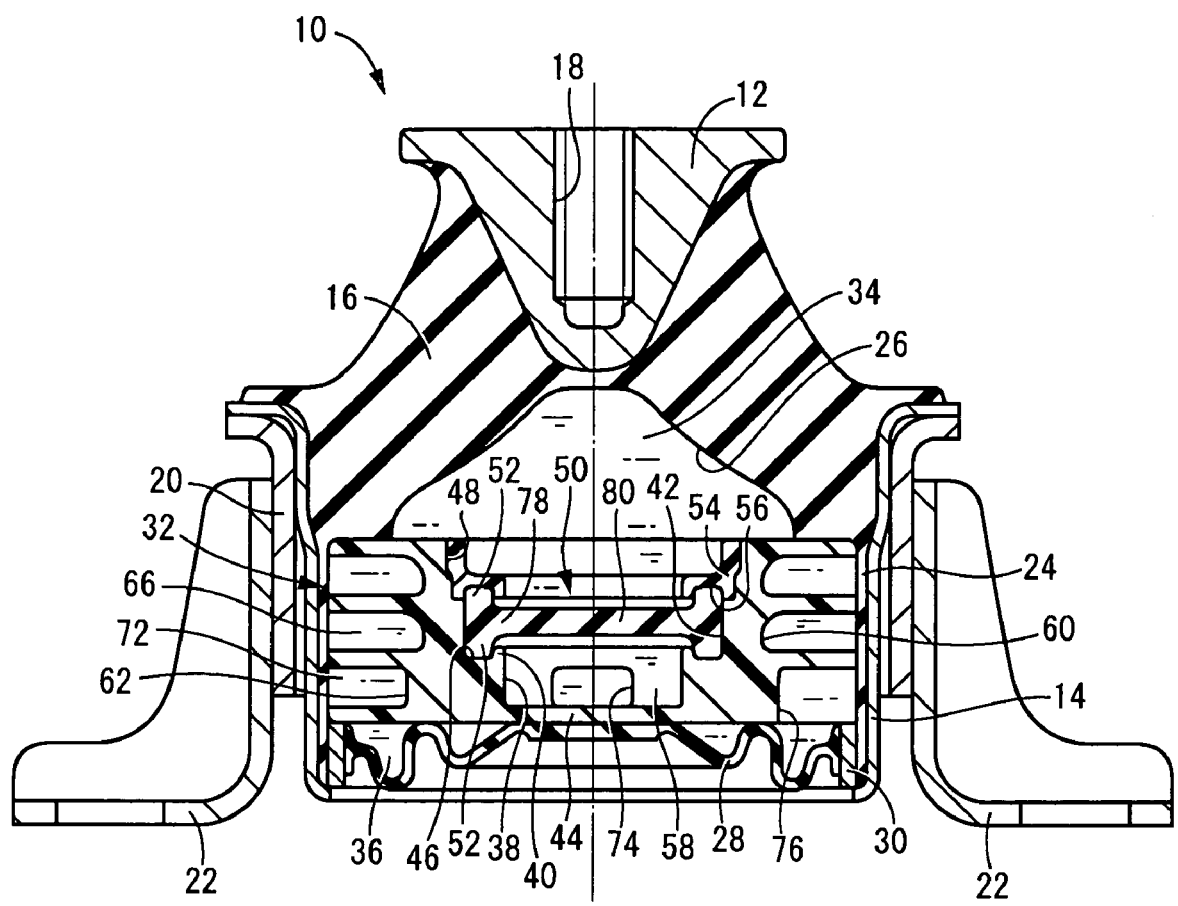
FIG. 1 is an elevational view in axial or vertical cross section of a fluid-filled type engine mount in the form of an automobile engine mount constructed according to a first embodiment of the invention, taken along line 1-1 of FIG. 2.

Referring first to FIG. 1, there is shown a fluid-filled type engine mount in the form of an automotive engine mount 10 of construction according to a first embodiment of the invention. This engine mount 10 is of construction wherein a first mounting member 12 of metal and a second mounting member 14 of metal are elastically coupled by a main rubber elastic body 16. The engine mount 10 is installed in an automotive vehicle by mounting the first mounting member 12 to the power unit of the vehicle as an one of the two components connected together in a vibration damping fashion, and mounting the second mounting member 14 to the vehicle body as the other of the two components connected together in a vibration damping fashion, so that the power unit is supported on the vehicle body in a vibration damping fashion. In the installed state, the distributed load of the power unit is exerted on the mount 10, the first mounting member 12 and the second mounting member 14 undergo displacement towards one another as the main rubber elastic body 16 undergoes elastic deformation, and the principal vibrations to be damped are input in the axial direction of the engine mount 10. In the description hereinbelow the vertical direction shall as general rule refer to the vertical direction in FIG. 1.

More specifically described, the first mounting member 12 is of generally frustoconical shape facing downward, with a threaded hole 18 disposed in its center portion. The first mounting member 12 is affixed to the power unit by means of bolting it to a mounting member on the power unit side, not shown, via a fastening bolt threaded into the threaded hole 18.

The second mounting member 14, on the other hand, has a large-diameter, generally round tubular shape. The second mounting member 14 is affixed to the vehicle body by means of press-fitting the second mounting member 14 into a tubular mount bracket 20 on the vehicle body side, and fastening a number of legs 22 affixed to the bracket 20 to the member on the vehicle body side with bolts or the like.

The first mounting member 12 is positioned spaced apart to the side of one of the openings (the upper one in FIG. 1) of the second mounting member 14, with the center axes of first mounting member 12 and the second mounting member 14 being positioned on generally the same line. The main rubber elastic body 16 is disposed between the first mounting member 12 and the second mounting member 14.

The main rubber elastic body 16 has a large-diameter, generally truncated frustoconical shape. The first mounting member 12 is inserted in the axial direction into the small-diameter end of the main rubber elastic body 16 and vulcanization bonded in place. The inside peripheral face of the second mounting member 14, over a distance extending from its axial upper end portion to its axial medial portion, is juxtaposed against the outside peripheral face of the large-diameter end of the main rubber elastic body 16, and vulcanization bonded in place. That is, the main rubber elastic body 16 is fabricated as an integrally vulcanization molded component furnished with the first mounting member 12 and the second mounting member 14, whereby the first mounting member 12 and the second mounting member 14 are elastically linked with one another by the main rubber elastic body 16, with one of the openings (the upper one in FIG. 1) of the second mounting member 14 closed fluid-tightly by the main rubber elastic body 16. The inside peripheral face of the second mounting member 14 over a distance extending from its axial medial portion to its axial lower end portion is covered by a thin seal rubber layer 24 integrally formed with the main rubber elastic body 16. A circular cavity 26 of generally inverted conical shape is formed on the large-diameter end face of the main rubber elastic body 16, thereby reducing tensile stress of the main rubber elastic body 16 produced by the distributed support load of the power unit.

A diaphragm 28 serving as a flexible film is disposed at the other opening (the lower one in FIG. 1) of the second mounting member 14. The diaphragm 28 takes the form of a thin rubber film imparted with slack thus making it readily deformable, having a fastener fitting 30 of large-diameter ring shape vulcanization bonded to its outside peripheral edge. The fastener fitting 30 is inserted within the second mounting member 14, whereupon the second mounting member 14 is subjected to a drawing or other such diameter constricting operation. By means of this procedure, the diaphragm 28 is affixed to the second mounting member 14, with the other opening of the second mounting member 14 closed fluid-tightly by the diaphragm 28.

Figure 2:
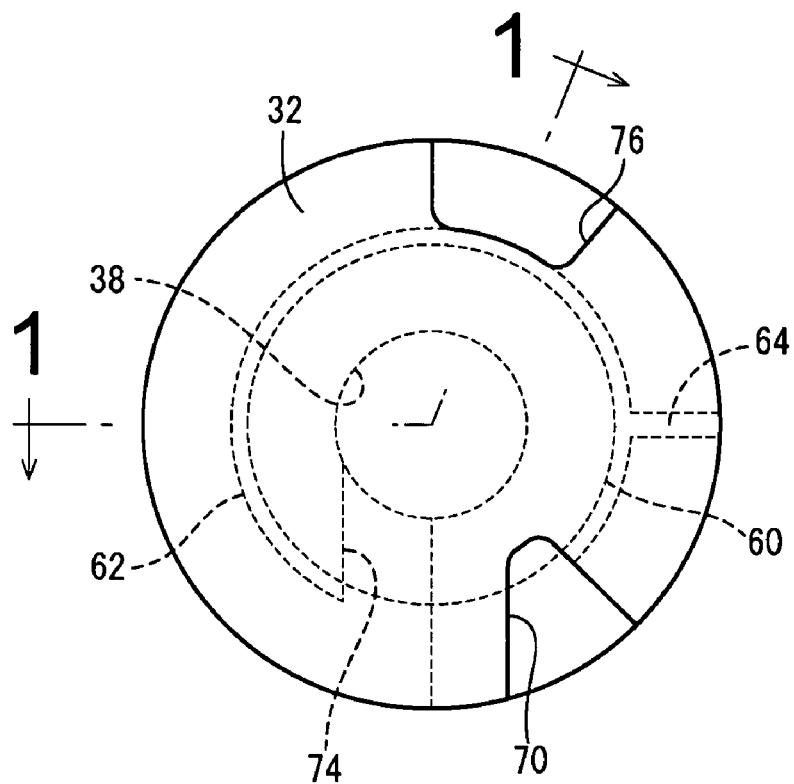
FIG. 2 is a bottom plane view of a partition member of the engine mount of FIG. 1.
Figure 3:
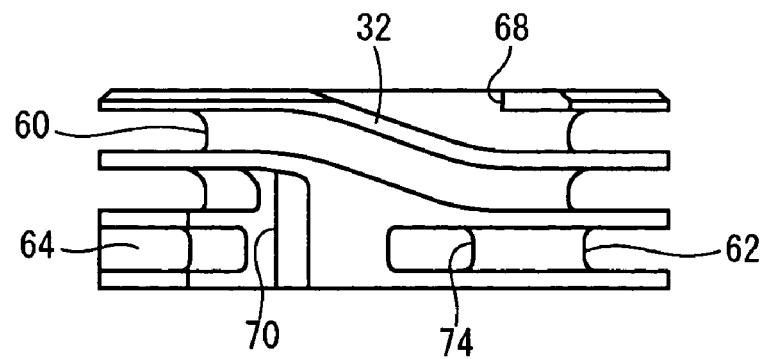
FIG. 3 is a side elevational view of the partition member of FIG. 2.

A partition member 32 is disposed between the main rubber elastic body 16 and the diaphragm 28, in the inside of the second mounting member 14. As depicted in FIGS. 2 and 3, the partition member 32 has a thick, generally disk shape overall, and is fabricated of rigid synthetic resin or metal material. The partition member 32, together with the diaphragm 28, is inserted into the second mounting member 14 from the other opening (the lower one in FIG. 1), and the second mounting member 14 is then subjected to a diameter constricting operation to affix them extending in the axis-perpendicular direction in the axial center portion of the second mounting member 14.

To one side of the partition member 32 (the upper side in FIG. 1) within the second mounting member 14, there is formed a pressure-receiving chamber 34 whose wall is partially constituted by the main rubber elastic body 16, and which gives rise to pressure fluctuations on the basis of elastic deformation of the main rubber elastic body 16. To the other side of the partition member 32 (the lower side in FIG. 1) within the second mounting member 14, there is formed an equilibrium chamber 36 whose wall is constituted by the diaphragm 28 and which readily permits change in volume on the basis of elastic deformation of the diaphragm 28. A non-compressible fluid is sealed within the pressure-receiving chamber 34 and the equilibrium chamber 36. As the sealed non-compressible fluid, it is preferable to use water, an alkylene glycol, a polyalkylene glycol, silicone oil or the like; in terms of effectively achieving vibration damping action on the basis of resonance action etc. of the fluid. It is particularly preferable to use a low-viscosity fluid having viscosity of 0.1 Pa·s or lower. As will be apparent therefrom, the rigid partition member 32 fixedly supported by the second mounting member 14 is disposed between the pressure-receiving chamber 34 and the equilibrium chamber 36, in other words, between the opposed faces of the main rubber elastic body 16 and the diaphragm 28.

A recess 38 which opens to one side in the axial direction (upward in FIG. 1) is formed in the center portion of the partition member 32. A step portion 40 is formed in the axial medial portion of the recess 38, with an opening 42 of the recess 38 being larger in diameter than the floor portion 44 to either side of this step portion 40. An annular mating groove 46 is formed on the outside periphery of the step portion 40. In the opening 42 of the recess 38, there is formed a mating aperture 48 larger in diameter than the opening 42, and opening onto a first axial end of the partition member 32.

A rubber elastic plate 50 serving as the movable film is disposed in the partition member 32. The rubber elastic plate 50 has a thin, generally disk shape, and is composed of a rubber elastic body. In terms of spring rigidity, the rubber elastic plate 50 is lower than the main rubber elastic body 16 but higher than the diaphragm 28. At the outside peripheral edge of the rubber elastic plate 50 are integrally formed annular projections 52, 52 of annular shape projecting to either side in the axial direction. The rubber elastic plate 50 is fitted within the opening 42 of the recess 38, with the outside peripheral edge of the rubber elastic plate 50 juxtaposed fluid-tightly against the opening 42 of the recess 38, and with the annular projection 52 to one axial side of the rubber elastic plate 50 (the upper side in FIG. 1) elastically deformed so as to fit within the mating groove 46 of the step portion 40 of the recess 38.

A mating member 54 of ring shape is fastened mating with the mating aperture 48 of the partition member 32. At the lower end of the mating member 54 there is integrally formed a flanged portion extending inward in the axis-perpendicular direction, with an annular mating groove 56 opening to one side in the axial direction (the lower side in FIG. 1) formed in the flange portion. When the mating member 54 is attached to the partition member 32, the annular projection 52 to the other axial side of the rubber elastic plate 50 (the upper side in FIG. 1) elastically deforms to fit within the mating groove 56.

With this arrangement, the outside peripheral edge of the rubber elastic plate 50 furnished with the pair of annular projections 52, 52 is held clamped between the mating member 54 and the step portion 40 of the partition member 32, affixing it fluid-tightly in the opening 42 of the recess 38 of the partition member 32. The rubber elastic plate 50, except for its outside peripheral edge portion, is disposed so as to be elastically deformable, principally in its thickness direction (the vertical in FIG. 1), while providing fluid-tight closure of the opening 42 of the recess 38. Like the pressure-receiving chamber 34 and the equilibrium chamber 36, the recess 38 covered by the rubber elastic plate 50 has non-compressible fluid sealed therein, forming an intermediate chamber 58 whose wall are composed to include the floor portion 44 and side walls of the recess 38, and the rubber elastic plate 50. That is, the pressure-receiving chamber 34 is formed to one side of the rubber elastic plate 50 (the upper side in FIG. 1), while the intermediate chamber 58 is formed to the other side of the rubber elastic plate 50 (the lower side in FIG. 1).

The outside peripheral portion on one axial side (the upper side in FIG. 1) and the outside peripheral portion of the axially medial portion of the partition member 32 are respectively furnished with circumferential grooves opening outward in the axis-perpendicular direction and extending over a distance just short of once around the circumference, for example. By connecting together a first end of each of these circumferential grooves, there is formed a first circumferential groove 60 that overall extends over a distance just short of twice around the circumference through the outside peripheral portion of the partition member 32. In the outside peripheral portion on the other axial side (the lower side in FIG. 1) of the partition member 32, there is formed a second circumferential groove 62 that opens outward in the axis-perpendicular direction and extends over a distance just short of once around the circumference, for example. By means of the respective first ends of the circumferential grooves being divided to either side of a barrier wall portion 64, the first circumferential groove 60 and the second circumferential groove 62 are formed independently in the partition member 32, while being disposed parallel to one another. The partition member 32 is fastened to the second mounting member 14 with the outside peripheral face of the partition member 32 juxtaposed tightly against the inside peripheral face of the second mounting member 14 via the seal rubber layer 24. Accordingly, the respective openings of the first circumferential groove 60 and the second circumferential groove 62 opening out in the axis-perpendicular direction are closed off fluid-tightly by the second mounting member 14.

The first circumferential groove 60 closed off by the second mounting member 14 constitutes a first orifice passage 66. A first end of this first orifice passage 66 connects with the pressure-receiving chamber 34 through a communication aperture 68 of notch shape formed in one axial end (the upper end in FIG. 1) of the partition member 32. The other end of the first orifice passage 66 connects with the equilibrium chamber 36 through a first communication window 70 of notch shape formed in the other axial end (the lower end in FIG. 1) of the partition member 32. By means of this arrangement, the pressure-receiving chamber 34 and the equilibrium chamber 36 communicate with one another through the first orifice passage 66. A second orifice passage 72 is constituted by the second circumferential groove 62 closed off by the second mounting member 14. A first end of the second orifice passage 72 connects with the intermediate chamber 58 through a communication hole 74 perforating the peripheral wall of the recess 38 of the partition member 32, while the other end of the second orifice passage 72 connects with the equilibrium chamber 36 through a second communication window 76 of notch shape formed at the other axial end of the partition member 32 at a different location from the first communication window 70. By means of this arrangement, the intermediate chamber 58 and the equilibrium chamber 36 communicate with each other through the second orifice passage 72. That is, in this embodiment, the first orifice passage 66 and the second orifice passage 72 are formed by utilizing the outside peripheral portion of the partition member 32.

In this embodiment, the resonance frequency of the fluid caused to flow through the first orifice passage 66 on the basis of relative pressure fluctuations produced in the pressure-receiving chamber 34 and the equilibrium chamber 36 during input of vibration is tuned so as to advantageously attain vibration damping action (high attenuating properties) against low frequency, large amplitude engine shake on the order of 10 Hz, for example, on the basis of resonance action of the fluid. The resonance frequency of the fluid caused to flow through the second orifice passage 72 on the basis of relative pressure fluctuations produced in the intermediate chamber 58 and the equilibrium chamber 36 during input of vibration is tuned so as to advantageously attain vibration damping action (low spring properties) against high frequency, small amplitude idling vibration on the order of 15-30 Hz, for example, on the basis of resonance action of the fluid. Tuning of the first orifice passage 66 and the second orifice passage 72 can be carried out, for example, by adjusting the passage length and passage cross sectional area of each orifice passage 66, 72, in consideration of the spring rigidity (a characteristic value equivalent to the level of pressure change required to produce a given change in unit volume) of the walls of the pressure receiving chamber, 34, the equilibrium chamber 36, and the intermediate chamber 58. Typically, the frequency at which the phase of pressure fluctuations transmitted through the orifice passage 66, 72 changes, producing an approximately resonant state, is understood to be the tuning frequency of that orifice passage 66, 72.

The rubber elastic plate 50 has the pair of annular projections 52, 52 at its outside peripheral edge, and the annular projections 52, 52 are held clamped between the mating member 54 and the step portion 40 of the partition member 32. With this arrangement, deformation of the generally annular disk-shaped outside peripheral portion 78 at the outside peripheral side of the rubber elastic plate 50 is constrained. In this embodiment, the constrained portion for limiting the level of deformation of the rubber elastic plate 50 is composed including the outside peripheral portion 78 of the rubber elastic plate 50, which is constrained by the mating member 54 and the step portion 40 of the partition member 32 that hold the outside peripheral portion 78 clamped between them.

On the other hand, the generally disk-shaped center portion 80 of the rubber elastic plate 50 lying inward from its outside peripheral portion 78 is positioned situated away from the outside peripheral edge constrained by the mating member 54 and the step portion 40 of the partition member 32, as well as being positioned largely facing the pressure-receiving chamber 34 and the intermediate chamber 58. This arrangement allows for deformation of a center portion 80 of the rubber elastic plate 50 on the basis of a relative pressure differential between the pressure-receiving chamber 34 and the intermediate chamber 58.

In the rubber elastic plate 50 of such design, when low-frequency, large-amplitude shaking vibration is input, the large amplitude of the pressure fluctuations produced in the pressure-receiving chamber 34 makes it difficult for the pressure fluctuations of the pressure-receiving chamber 34 to be absorbed through elastic deformation (in particular, elastic deformation in the soft deformation zone).

When high-frequency, small-amplitude idling vibration is input, principally the center portion 80 of the rubber elastic plate 50 undergoes elastic deformation, so that the pressure fluctuations produced in the pressure-receiving chamber 34 reach the intermediate chamber 58, and deformation of the rubber elastic plate 50 is produced in the low spring properties zone on the basis of deformation of its center portion 80.

In particular, during input of vibration of greater amplitude than idling vibration in a higher frequency range than the resonance frequency of the first orifice passage 66, deformation of the rubber elastic plate 50 reaches the high spring properties zone on the basis of elastic deformation of the outside peripheral portion 78. In this embodiment in particular, the spring rigidity of the rubber elastic plate 50 and the shape, size, and construction of the rubber elastic plate 50 and the partition member 32 are designed such that under conditions of input of vibration having amplitude at least 1.5 times that of idling vibration in a frequency band higher than the resonance frequency of the first orifice passage 66, deformation of the rubber elastic plate 50 reaches the high spring properties zone.

Figure 4:
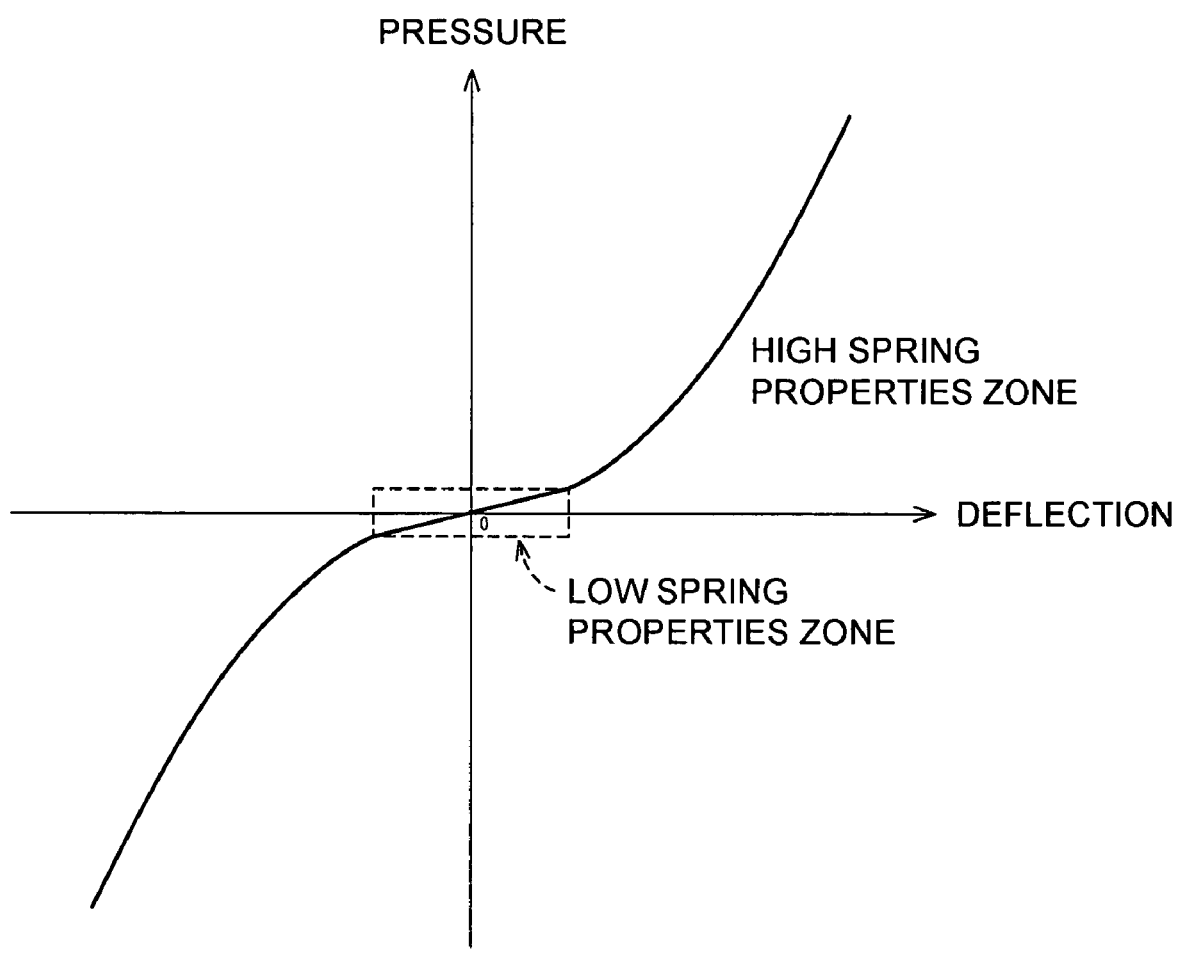
FIG. 4 is a graph showing pressure-deflection properties of a rubber elastic plate of the engine mount of FIG. 1.

Specifically, as depicted in FIG. 4, deformation of the rubber elastic plate 50 takes the general form of two linear zones of differing slope in the graph of the pressure-deflection curve, specifically, that occurring a low deflection zone constituting the low spring properties zone, produced by deformation of the center portion 80 during input of small-amplitude vibration such as idling vibration; and that reaching into a high deflection zone constituting the high spring properties zone, produced by deformation of the outside peripheral portion 78 during input of vibration of larger amplitude than idling vibration. It should be appreciated that the low deflection zone is a substantially linear zone, while the high deflection zone is not a precise linear zone since it includes a curve zone at the portion adjacent to the low deflection zone. That is, the rubber elastic plate 50 is imparted with non-linear spring properties by means of the difference in spring properties exhibited separately by its center portion 80 and its outside peripheral portion 78. The design of such non-linear spring properties is accomplished through tuning the shape, size, and construction of the center portion 80, the outside peripheral portion 78, the annular projections 52, 52, the mating member 54, and the partition member 32. The pressure-deflection curve (spring properties) of the rubber elastic plate 50 pertaining to this embodiment correspond to the level of pressure change required to produce a change in unit volume in the rubber elastic plate 50 that makes up part of the wall of the fluid chamber composed of the pressure-receiving chamber 34, the equilibrium chamber 36, and the intermediate chamber 58. Deflection of the rubber elastic plate 50 refers to deformation in the thickness direction (the vertical in FIG. 1) produced by dynamic pressure based on a relative pressure differential between the pressure-receiving chamber 34 and the intermediate chamber 58. The rubber elastic plate 50 pressure-deflection curve shown in FIG. 4 has been computed by subjecting the rubber elastic plate 50 to direct loading with a static load equivalent to the relative pressure differential between the pressure-receiving chamber 34 and the intermediate chamber 58, and measuring the level of deformation in the thickness direction with respect to the load. This static load is generally equivalent to the dynamic pressure which would be exerted by the pressure-receiving chamber 34 and the intermediate chamber 58 with the rubber elastic plate 50 installed in the mount 10.

In the automotive engine mount 10 having construction as described previously, when engine shake is input, since the amplitude of the pressure fluctuations produced in the pressure-receiving chamber 34 is too large for it to be fully absorbed through elastic deformation of the rubber elastic plate 50, the flow of fluid through the second orifice passage 72 is limited. Thus, flow action such as resonance action of the fluid caused to flow through the first orifice passage 66 between the pressure-receiving chamber 34 and the equilibrium chamber 36 is produced effectively, on the basis of the pressure fluctuations produced in the pressure-receiving chamber 34. Consequently, vibration attenuating action is advantageously attained on the basis of the flow action of fluid through the first orifice passage 66.

When idling vibration is input, the flow resistance of the first orifice passage 66 rises markedly to the point that it becomes substantially closed off. However, as the pressure fluctuations produced in the pressure-receiving chamber 34 are relatively small, the pressure fluctuations of the pressure-receiving chamber 34 are exerted efficiently on the intermediate chamber 58 through elastic deformation of the rubber elastic plate 50, on the basis of the low spring properties of the rubber elastic plate 50 due to elastic deformation of its center portion 80. Accordingly, the flow action of the fluid through the second orifice passage 72 between the intermediate chamber 58 and the equilibrium chamber 36 is produced effectively. Consequently, vibration isolating action is advantageously attained on the basis of the flow action of fluid through the second orifice passage 72.

When the vehicle drives over deep corrugated pavement, vibration of amplitude greater than idling vibration is input in a frequency range higher than the resonance frequency of the first orifice passage 66. In this condition, the rubber elastic plate 50 will undergo active and appreciable elastic deformation. This leads to a risk that a high level of negative pressure will be created locally in the intermediate chamber 58, due to pressure fluctuations exerted on the intermediate chamber 58 by means of this elastic deformation of the rubber elastic plate 50.

Under conditions where vibration of amplitude greater than idling vibration is input in a frequency range higher than the resonance frequency of the first orifice passage 66, elastic deformation of the outside peripheral portion 78 will predominate over that of the center portion 80, and deformation of the rubber elastic plate 50 will be limited on the basis of the high spring properties of the rubber elastic plate 50 resulting from this deformation of the outside peripheral portion 78. Consequently, the occurrence of a high vacuum condition within the intermediate chamber 58 can be suppressed, and the occurrence of cavitation bubbles can be reduced or avoid altogether.

In the event that vibration of amplitude greater than idling vibration is input in a frequency range lower than the resonance frequency of the first orifice passage 66, the pressure fluctuations produced in the pressure-receiving chamber 34 will escape into the equilibrium chamber 36 through the first orifice passage 66, thus avoiding the creation of excessive negative pressure within the intermediate chamber 58, without needing to utilize the spring properties of the rubber elastic plate 50.

Consequently, in the fluid-filled type engine mount 10 according to this embodiment, the provision of the rubber elastic plate 50 having non-linear spring properties assures an adequate level of vibration damping action on the basis of flow action of fluids through the first and second orifice passages 66, 72, while at the same time a condition of high negative pressure in the intermediate chamber 58, thought to be responsible for the formation of cavitation bubbles, is avoided. As a result, the problem of impulsive abnormal noise and vibration caused by the production of cavitation bubbles can be suppressed effectively.

In order to verify effectiveness in reducing problematic impulsive abnormal noise and vibration in relation to the engine mount 10 according to this embodiment, the vibration damping properties of the mount 10 was measured. Namely, an initial load equivalent to the distributed support load of the power unit is applied to the engine mount 10. In this state, vibration of amplitude greater than idling vibration in a frequency range higher than the resonance frequency of the first orifice passage 66 is input in the axial direction, which is also the direction of load input (the vertical in FIG. 1) in order to bring about excited displacement of the first mounting member 12. In this condition, the load transferred to the second mounting member 14 was measured with an acceleration sensor mounted on the second mounting member 14.

The results show that the engine mount of construction according to this embodiment is capable of suppressing transmission of high frequency components, in comparison with a comparative example, e.g. an engine mount of conventional construction as shown in the aforementioned JP-A-2001-336564, where the pressure receiving chamber 34 and the intermediate chamber 58 are partitioned by a rigid partitioning wall. This shows the technical improvements of the present invention that is effective to solve the problem in the conventional vibration damping mount in terms of vibration damping properties upon input of impulsive load.

Figure 5:
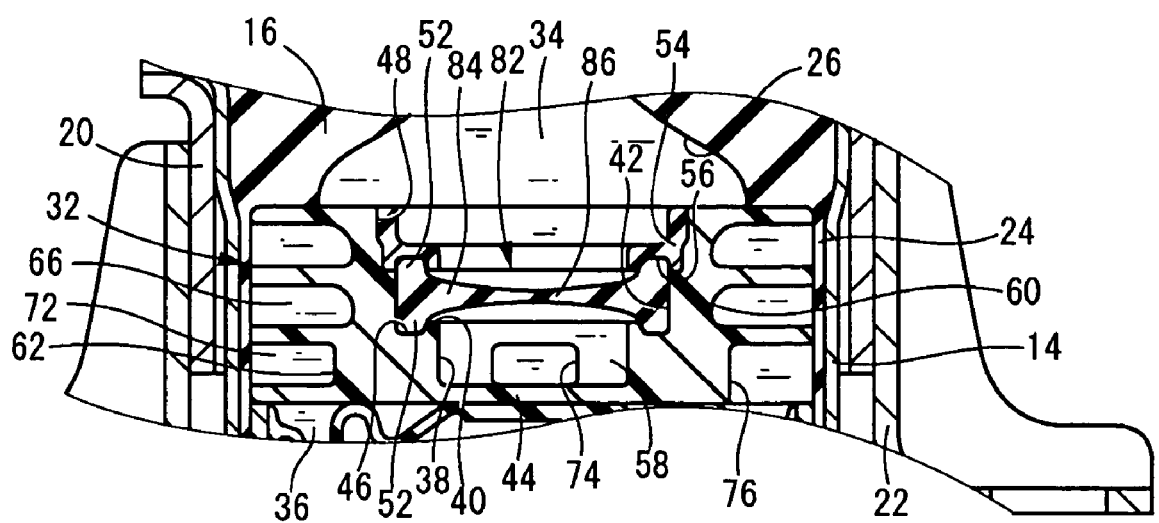
FIG. 5 is a fragmental cross sectional view of an engine mount constructed according to the second embodiment of the invention.
Figure 6:
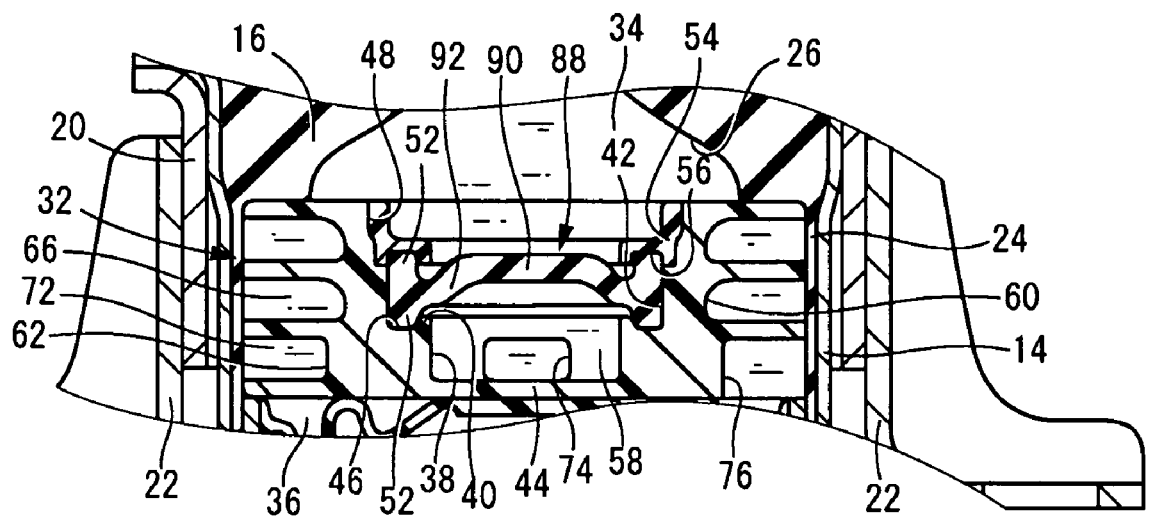
FIG. 6 is a fragmental cross sectional view of an engine mount constructed according to the third embodiment of the invention.
Figure 7:
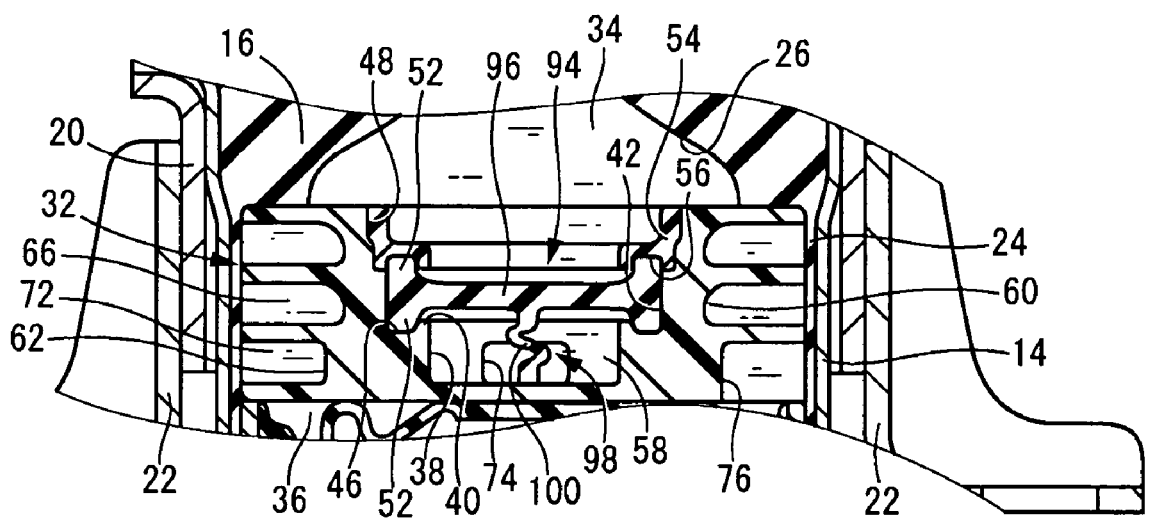
FIG. 7 is a cross sectional view of an engine mount constructed according to the fourth embodiment of the invention.

Next, FIG. 5 depicts an automotive engine mount of construction according to a second embodiment of the invention. FIG. 6 depicts an automotive engine mount of construction according to a third embodiment of the invention. FIG. 7 depicts an automotive engine mount of construction according to a fourth embodiment of the invention. The second to fourth embodiments differ from the first embodiment in terms of the shape, size, and construction of the rubber elastic plate which makes up part of the mount. In the description hereinbelow, parts and areas having substantially the same structure as the first embodiment are assigned the same reference numerals as the first embodiment in the drawings, and will not be described in any detail.

In the rubber elastic plate 82 pertaining to the second embodiment, the thickness dimension decreases gradually going diametrically inward from the outside edge portion of the rubber elastic plate 82 where the annular projections 52, 52 are formed. In particularly, with regard to the extent to which the thickness dimension of the rubber elastic plate 82 decreases, the decrease is greater in the generally annular disk shaped diametrically medial portion of the rubber elastic plate 82 reaching from its outside edge portion to the center portion than in the generally disk-shaped center portion of the rubber elastic plate 82. The diametrically medial portion in which the extent to which the thickness dimension decreases is greater constitutes a thick portion 84, while the center portion in which the extent to which the thickness dimension decreases is smaller such that the thickness dimension is approximately constant constitutes a thin portion 86.

When idling vibration is input, deformation of the rubber elastic plate 82 is produced in the low deflection zone by means of deformation of the thin portion 86. Whereas when vibration of amplitude greater than idling vibration in a frequency range higher than the resonance frequency of the first orifice passage 66 is input, the deformation reaches the large deflection zone by means of deformation of the thick portion 84. Accordingly, the rubber elastic plate 82 is endowed with non-linear spring properties with respect to elastic deformation in the thickness direction (the vertical in FIG. 5).

In the rubber elastic plate 88 pertaining to the third embodiment, a disk-shaped portion 90 of generally circular disk shape is formed in the center portion. At the outside peripheral side of the disk-shaped portion 90, between the disk-shaped portion 90 and the outside peripheral edge portion thereof where the annular projection 52 is integrally formed, there is formed a tapered portion 92 of tapering shape whose diameter dimension decreases gradually from the intermediate chamber 58 towards the pressure-receiving chamber 34, with the tapered portion 92 projecting from the intermediate chamber 58 towards the pressure-receiving chamber 34.

When idling vibration is input, deformation of the rubber elastic plate 88 is produced in the low deflection zone by means of deformation of the disk-shaped portion 90. Whereas when vibration of amplitude greater than idling vibration in a frequency range higher than the resonance frequency of the first orifice passage 66 is input, the deformation reaches the large deflection zone by means of deformation of the tapered portion 92. Accordingly, the rubber elastic plate 88 is endowed with non-linear spring properties with respect to elastic deformation in the thickness direction (the vertical in FIG. 6).

In the rubber elastic plate 94 pertaining to the fourth embodiment, a rod-shaped elastic projection 98 extending to one side in the direction of displacement of the rubber elastic plate 94 is integrally formed in the center portion of an elastic plate body 96 of similar construction to the rubber elastic plate 50 pertaining to the first embodiment. The distal end portion of the elastic projection 98 abuts the floor portion 44 of the recess 38 which constitutes part of the wall of the intermediate chamber 58. A bending portion 100 bent in a crank configuration is disposed in the medial portion in the axial direction (the vertical in FIG. 7) of the elastic projection 98.

When idling vibration is input, there appears a small stroke zone in which shearing deformation of the bending portion 100 is predominant. Whereas when vibration of amplitude greater than idling vibration in a frequency range higher than the resonance frequency of the first orifice passage 66 is input, there appears a large stroke zone in which compressive deformation of the bending portion 100 is predominant. That is, deformation of the rubber elastic plate 94 is produced in the low deflection zone by means of deformation of the bending portion 100. Whereas when vibration of amplitude greater than idling vibration in a frequency range higher than the resonance frequency of the first orifice passage 66 is input, the deformation reaches the large deflection zone by means of deformation of the bending portion 100. Accordingly, the rubber elastic plate 94 is endowed with non-linear spring properties with respect to elastic deformation in the thickness direction (the vertical in FIG. 7).

In these second to fourth embodiments, in addition to providing a constrained portion for limiting the level of elastic deformation of the rubber elastic plate 50, composed including the annular projection 52, the step portion 40 of the partition member 32, and the mating member 54 as in the first embodiment, irregular-shape portions that imparts non-linear spring properties to the rubber elastic plate per se are formed in each of them. Specifically, in the second embodiment the irregular-shape portions are composed including the thick portion 84 and the thin portion 86. In the third embodiment the irregular-shape portions are composed including the disk-shaped portion 90 and the tapered portion 92. In the fourth embodiment, the irregular-shape portions are composed including the elastic plate body 96 and the elastic projection 98 having the bending portion 100.

Accordingly, in any of the engine mounts pertaining to the second to fourth embodiments, since the rubber elastic plate is furnished with a constrained portion and irregular-shape portions, the intended non-linear spring properties are attained with high accuracy, and vibration damping and sound damping action utilizing the spring properties of the rubber elastic plate are more advantageously produced.

While the present invention has been described in detail in its presently preferred embodiments, for illustrative purpose only, it is to be understood that the invention is by no means limited to the details of the illustrated embodiment, but may be otherwise embodied. It is also to be understood that the present invention may be embodied with various other changes, modifications and improvements, which may occur to those skilled in the art, without departing from the spirit and scope of the invention.

For example, the shape, size, construction, placement, number and other aspects of the rubber elastic plate are not limited to those taught by way of example herein.

Figure 8:
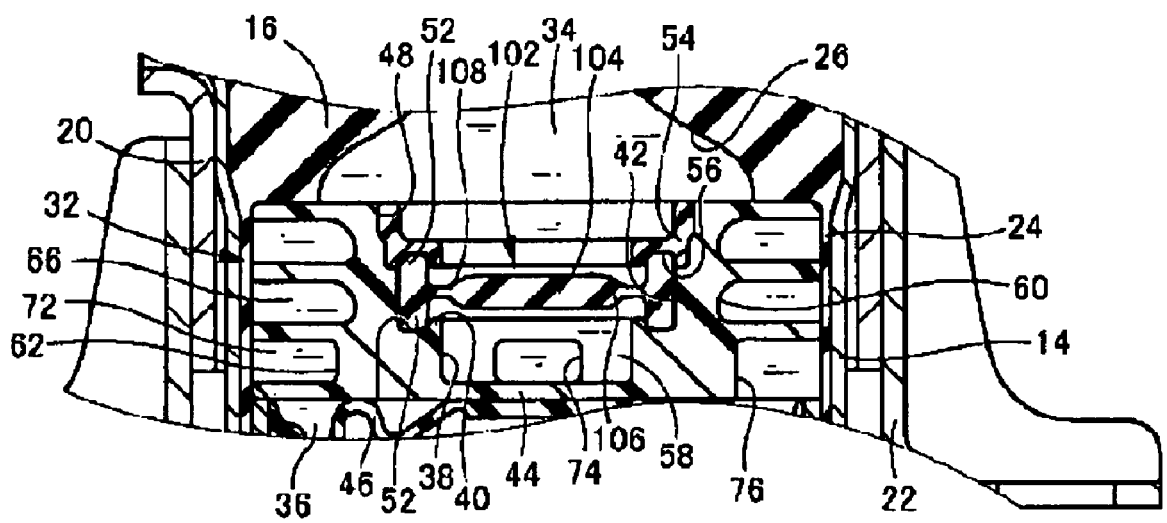
FIG. 8 is a fragmental cross sectional view of an engine mount constructed according to another embodiment of the invention.

Whereas in the second embodiment described above a thin portion 86 of smaller thickness dimension is formed in the center portion of the rubber elastic plate 82, and a thick portion 84 of larger thickness dimension is formed in the outside peripheral portion of the rubber elastic plate 82, it would be acceptable instead to form a thick portion 104 of generally unchanging thickness dimension in the center portion of a rubber elastic plate 102, and to form in the outside peripheral portion of the thick portion 104 a thin portion 108 via a gradually changing portion 106 whose thickness dimension decreases gradually moving diametrically outward, as shown in FIG. 8 for example.

Also, whereas in the embodiments described above part of the wall of the intermediate chamber 58 is constituted by a single rubber elastic plate disposed in the opening 42 of the partition member 32, it would be acceptable instead for part of the wall of the intermediate chamber 58 to be constituted by a single, or two or more rubber elastic plates disposed at a location or locations different from the opening 42 of the partition member 32, for example.

Additionally, the shape, size, construction, number, placement and other aspects of the partition member 32 and the first and second orifice passages 66, 72 are not limited to those taught by way of example herein. For example, whereas in the embodiments described above the first orifice passage 66 and the second orifice passage 72 are disposed parallel to one another by virtue of being constituted by a first circumferential groove 60 and second circumferential groove 62 that are formed independently, this first circumferential groove 60 and second circumferential groove 62 could instead be connected to one another at one end, so that the first orifice passage 66 is constituted to include both the first and second circumferential groove 60, 62 while the second orifice passage 72 is constituted to include the second circumferential groove 62, so that the first orifice passage 66 and the second orifice passage 72 are disposed in-line with one another.

The present invention is applicable to tubular engine mounts such as those employed as an FF type automotive engine mounts or suspension bushings like that disclosed for example in Japanese Unexamined Patent Application 2-240430, wherein an outer tubular member of large-diameter tubular shape serving as the second mounting member is disposed spaced apart to the outside in the axis-perpendicular direction from a shaft member serving as the first mounting member, with a main rubber elastic body interposed between the axis-perpendicular opposing faces of the shaft member and the outer tubular member, and with the shaft member and the outer tubular member linked by the main rubber elastic body.

What is claimed is:

1. A fluid-filled type engine mount for a vibration damping coupling of two components, comprising:
    a first mounting member fixable to one of the two components;
    a second mounting member fixable to an other of the two components;
    a main rubber elastic body elastically connecting the first and second mounting members which are arranged in a spaced-away fashion;
    a pressure-receiving chamber whose wall is partially defined by the main rubber elastic body;
    an equilibrium chamber whose wall is partially defined by a flexible film;
    an intermediate chamber whose wall is partially defined by a movable film, the pressure-receiving chamber and the intermediate chamber being situated to either side of the movable film, and a non-compressible fluid being sealed within the pressure-receiving chamber, the equilibrium chamber, and the intermediate chamber;
    a first orifice passage interconnecting the pressure-receiving chamber and the equilibrium chamber, and formed such that a resonance frequency of the fluid caused to flow through the first orifice passage is tuned to that of engine shake; and
    a second orifice passage interconnecting the intermediate chamber and the equilibrium chamber, and formed such that a resonance frequency of the fluid caused to flow through the second orifice passage is tuned to that of idling vibration,
    wherein the movable film includes a tabular body composed of a rubber elastic body, and is imparted with non-linear spring properties in response to elastic deformation in a width direction thereof so that deformation of the movable film during input of the idling vibration occurs in a low spring properties zone, whereas deformation of the movable film during input of vibration of greater amplitude than the idling vibration in a higher frequency range than the resonance frequency of the first orifice passage reaches a high spring properties zone.

2. A fluid-filled type engine mount according to claim 1, wherein under conditions of input of vibration having amplitude at least 1.5 times that of the idling vibration in a frequency band higher than the resonance frequency of the first orifice passage, deformation of the movable film reaches the high spring properties zone.

3. A fluid-filled type engine mount according to claim 1, wherein the movable film is furnished with a constrained portion for limiting a level of elastic deformation thereof so that non-linear spring properties is imparted to the movable film.

4. A fluid-filled type engine mount according to claim 1, wherein the movable film has a irregular-shape portion for imparting non-linear spring properties with respect to elastic deformation in a thickness direction of the movable film.

5. A fluid-filled type engine mount according to claim 4, wherein the irregular-shape portion of the movable film is formed by a thick portion and a thin portion of mutually different thickness dimension so that the movable film is endowed with the non-linear spring properties.

6. A fluid-filled type engine mount according to claim 4, wherein the irregular-shape portion of the movable film is formed by a low spring portion of disk shape formed in a center of the movable film and a high spring portion of tapered shape formed to an outside periphery of the low spring portion with the high spring portion being situated projecting towards the pressure-receiving chamber so that the movable film is endowed with the non-linear spring properties.

7. A fluid-filled type engine mount according to claim 4, wherein the movable film includes an elastic projecting portion integrally formed in a center portion thereof, extending in a direction of displacement of the movable film, being held in abutment at a distal end thereof against an inside face of the intermediate chamber positioned spaced apart from the movable film by a prescribed distance, and having a bending portion bending in a crank configuration disposed in a medial portion thereof so that the low spring properties is attained in a shearing deformation zone of the bending portion so as to endow the movable film with non-linear spring properties.

8. A fluid-filled type engine mount according to claim 1, further comprising: a partition member fixedly supported by means of the second mounting member and disposed between the pressure-receiving chamber and the equilibrium chamber, wherein the partition member has a recess opening towards the pressure-receiving chamber side and formed in a center portion of the partition member so that an opening of the recess is provided with fluid-tight closure by the movable film to form the intermediate chamber, and an outside peripheral portion of the partition member is utilized to form the first orifice passage and the second orifice passage.

9. A fluid-filled type engine mount according to claim 8, wherein the second mounting member is of round tubular shape, the first mounting member is disposed spaced apart to a side of a first opening of the second mounting member, the first mounting member and the second mounting member are connected by the main rubber elastic body thereby providing fluid-tight closure of the first opening of the second mounting member, an other opening of the second mounting member being provided with fluid-tight closure by the flexible film, and the partition member is inserted into the second mounting member and positioned between opposed faces of the main rubber elastic body and the flexible film.

10. A fluid-filled type engine mount according to claim 1, wherein the movable film has a thickness dimension decreasing gradually going diametrically inward from an outside edge portion thereof.

11. A fluid-filled type engine mount according to claim 10, wherein an extent of decrease in the thickness dimension of the movable film is greater in diametrically medial portion thereof than in a center portion thereof.

* * * * *